United States Patent
Kubo

(10) Patent No.: US 7,324,749 B2
(45) Date of Patent: Jan. 29, 2008

(54) IMAGE DISPLAY METHOD, IMAGE DISPLAY APPARATUS AND IMAGE DISPLAY PROGRAM

(75) Inventor: Masahiro Kubo, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 358 days.

(21) Appl. No.: 11/085,079

(22) Filed: Mar. 22, 2005

(65) Prior Publication Data

US 2005/0212814 A1 Sep. 29, 2005

(30) Foreign Application Priority Data

Mar. 25, 2004 (JP) .............................. 2004-090449

(51) Int. Cl.
*G03B 29/00* (2006.01)
*G06K 15/02* (2006.01)
*G06F 17/00* (2006.01)
*H04N 1/60* (2006.01)

(52) U.S. Cl. ...................... 396/429; 358/527; 358/452; 715/527; 715/528

(58) Field of Classification Search ................ 396/287, 396/300, 374, 429; 348/207.1, 333.05, 333.11, 348/333.12; 358/452, 527, 537; 715/527, 715/528

See application file for complete search history.

(56) References Cited

U.S. PATENT DOCUMENTS

| | | | | |
|---|---|---|---|---|
| 5,486,893 A | * | 1/1996 | Takagi ........................ | 396/147 |
| 5,543,833 A | * | 8/1996 | Toyoda et al. .............. | 348/110 |
| 6,333,752 B1 | * | 12/2001 | Hasegawa et al. .......... | 715/764 |
| 2003/0076312 A1 | * | 4/2003 | Yokoyama .................. | 345/204 |
| 2005/0212819 A1 | * | 9/2005 | Kubo et al. ................. | 345/619 |

FOREIGN PATENT DOCUMENTS

JP  11-136528 A  5/1999

* cited by examiner

*Primary Examiner*—W. B. Perkey
(74) *Attorney, Agent, or Firm*—Sughrue Mion, PLLC

(57) ABSTRACT

An image correcting personal computer displays on its monitor a correction screen consisting of a main display area, a sub display area and a parameter adjusting area. The main display area is divided into a plural number of split image display sections displaying split images corresponding to the same fragment of an image to correct. The split image display sections may display the split images in conditions corrected differently from each other, by changing the correction parameters on the parameter adjusting area while selecting one of the split image display sections, except a referential display section that displays the split image in default conditions corrected with fixed correction parameter values.

24 Claims, 9 Drawing Sheets

IMAGE DISPLAY METHOD, IMAGE DISPLAY APPARATUS AND IMAGE DISPLAY PROGRAM

FIELD OF THE INVENTION

The present invention relates to a method of and an apparatus for displaying images on a monitor that is attached to a data processing terminal such as a personal computer, for processing electronic or digital images taken through a digital camera and the like. The present invention relates also to a image display program for these method and apparatus.

BACKGROUND ARTS

With a personal computer or other kind of data processing terminal, digital images can be corrected in color-balance, tone curve or other characteristics, to improve their qualities. For example, image data taken through a digital camera are sent to the personal computer. Then, an operator may adjusts various kinds of correction parameters while observing images displayed on a monitor of the personal computer based on the image data, in order to finish images according to the operator's intension. In case of a digital camera that can output original or raw image data that is not subjected to white-balance correction or other image-processing, it is possible to correct images in the personal computer without missing any color data on the side of the digital camera.

As an efficient image correction method, Japanese Laid-open Patent Application No. Hei 11-136528 suggests displaying a number of sample images of the same content but corrected with different correction parameters, simultaneously on the monitor, to allow an operator to select one among those sample images while observing differences in correction result between the different correction parameters. Then, the image data is processed with the correction parameter corresponding to the selected sample image.

Since the above mentioned prior art displays the sample images separately from one another, the operators have to move their eyes widely and repeatedly to compare the sample images to each other, so it is difficult to differentiate between the correction results when the correction parameters are finely adjusted. But in those cases seeking high-quality images with special intentions, such as wedding shots, commercial shots and other studio shots, it is necessary to adjust the correction parameters finely and strictly.

SUMMARY OF THE INVENTION

In view of the foregoing, a primary object of the present invention is to provide a image display method, a image display apparatus and a image display program, which facilitates visual discrimination between correction results on displayed images which are corrected using different correction parameters.

In order to make it easy for the operator to discriminate between the correction results obtained from different correction parameter values, it is effective to display the correction results side by side on the same screen. Therefore, to achieve the above and other objects, according to the present invention, an image display method suggests splitting an image display area of a monitor into a plural number of split image display sections for displaying split images which correspond to substantially the same fragment of an image to correct, and displaying the split images in conditions corrected based on such correction parameter values that are set individually for the split image display sections.

It is preferable to display an index member for indicating the selected split image display section in a peripheral portion around the image display area.

According to a preferred embodiment, at least one of the split image display sections is a referential image display section that displays the split image in conditions corrected with fixed correction parameter values.

It is also preferable to displaying an index member for indicating the referential image display section in a peripheral portion around the image display area.

According to a preferred embodiment, at least an information window in association with selected one of the split image display sections, the information window showing a list of correction parameter values used for the split image displayed in the selected split image display section.

According to the present invention, an image display apparatus with a monitor for displaying an image to correct in an image display area, the image display device comprises a device for forming a plural number of split image display sections in the image display area, the split image display sections displaying split images which correspond to substantially the same fragment of the image to correct; and a device for displaying the split images in conditions corrected based on individual correction parameter values set respectively for the split image display sections.

The present invention also provide an image display program for activating a computer to work as a device for forming a plural number of split image display sections in an image display area on a monitor, to display substantially the same fragment of an image to correct in the split image display sections, a device for setting correction parameter values individually on the split image display sections, and a device for displaying the fragment of the image to correct in the split image display sections respectively in conditions corrected based on the individually set correction parameter values.

Because the split image display sections display the same fragment corrected with different correction parameter values, the operator can compare the difference between the correction results obtained from the different correction parameter values, without the need for widely moving the eyes on the screen.

Providing at least a referential image display section among these split image display sections makes it possible to compare corrected images with a referential image corrected with default correction parameter values. In order to facilitates the comparison with the referential image, it is preferable to make it possible to change the position of the referential image display section with any of the split image display sections. Then the operator can place the referential image display section in adjacent to an appropriate one of the split image display sections.

For the same purpose, it is also preferable to place a plural number of such referential image display sections among the split image display sections such that wherein the referential image display sections are displayed such that all of those split image display sections other than the referential image display sections are adjacent to the referential image display sections.

BRIEF DESCRIPTION OF THE DRAWINGS

The above and other objects and advantages will be more apparent from the following detailed description of the preferred embodiments when read in connection with the accompanied drawings, wherein like reference numerals designate like or corresponding parts throughout the several views, and wherein.

DESCRIPTION OF THE PREFERRED EMBODIMENTS

Figure 1:
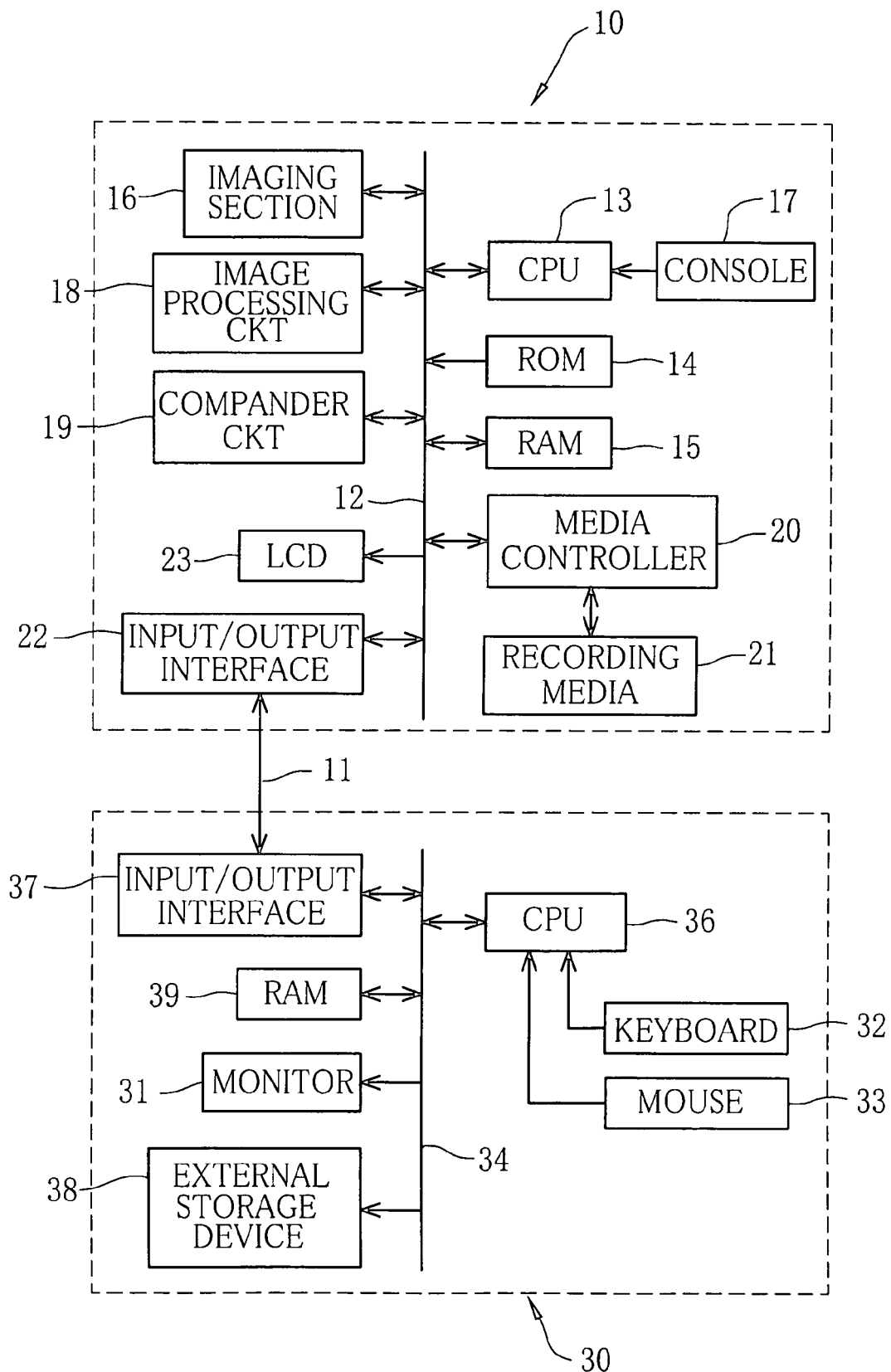
FIG. 1 is a block diagram schematically illustrating a digital camera and a personal computer for correcting images taken by the digital camera.

In FIG. 1, a digital camera 10 and a personal computer (PC) 30 are connected to each other through a communication cable 11, so that they may send and receive camera control data and image data between each other. The image correcting PC 30 may be a commercially available personal computer insofar as it is installed with an image correction program including a image display program of the present invention. The communication cable 11 may be of USB (Universal Serial Bus) type or IEEE1394 type. Instead of the communication cable 11, a radio communication device is usable for data communication between the digital camera 10 and the image correcting PC 30.

All components of the digital camera 10 are connected to each other through a data bus 12, and their operations are controlled comprehensively by a CPU 13. A ROM 14 stores programs necessary for the operation of the digital camera 10, and some of the programs are loaded in a RAM 15 according to the needs. An imaging section 16 is provided with an image forming lens, a CCD and other well-known members for photoelectric conversion of an optical image of a subject into digital image data. Imaging conditions, including an aperture value and a shutter speed, are set up by operating a console 17 with many setup buttons. It is also possible to designate the imaging conditions on the image correcting PC 30, and send data of the designated imaging conditions to the digital camera 10 to set the digital camera 10 in these conditions. It is alternatively possible to connect another personal computer to the digital camera 10, to control the digital camera 10 through this personal computer.

The image data output from the imaging section 16 is temporarily stored in the RAM 15. The image data stored in the RAM 15 is raw image data before going through image processing like white-balance correction, and consists of a large number of 12-bit pixel data representative of a tone level for each of three primary colors. An image processing circuit 18 processes the raw image data to convert the 12-bit pixel data of each color into 8-bit data, correct white-balance and convert gradation in accordance with predetermined conditions for respective camera types. A compander circuit 19 compresses the processed image data according to JPEG (Joint Photographic Coding Expert Group) format, and outputs the compressed image data. The compander circuit 19 also subjects the processed image data to a decimation for producing JPEG thumbnail image data of 1280×960 pixels.

The raw image data or the compressed image data is sent together with the thumbnail image data to the image correcting PC 30 via an input/output interface 22. An LCD 23 displays images of subjects continuously during a camera mode, and also displays images recorded on a removable recording medium 21 during a reproduction mode.

Whether the digital camera 10 outputs the raw image data or the compressed image data is decided with other camera conditions. It is also possible to output both the raw image data and the compressed image data. The present embodiment will be described with respect to a case where the digital camera 10 outputs the raw image data and the thumbnail image data. Furthermore, the raw image data may be transferred to the image correcting PC 30 by recording it on the recording medium 21 and setting the recording medium 21 in the image correcting PC 30, though the raw image data is sent through the communication cable 11 to the image correcting PC 30 in the following embodiment.

The image correcting PC 30 reproduces images based on the raw image data and displays the reproduced images on a monitor 31. The image correcting PC 30 also carries out different kinds of image correction in accordance with signals entered through input devices such as a keyboard 32 and a mouse 33. All components of the image correcting PC 30 are connected to each other through a data bus 34, and their operations are controlled comprehensively by a CPU. The image data received from the digital camera 10 is written on an external storage device 38 via an input/output interface 37 and the data bus 34. In a case where the image correcting PC 30 is used for controlling the digital camera 10, the input devices, including the keyboard 32 and the mouse 33, are operated for designating the camera conditions as well as for the image correction.

The image correction program is installed in the external storage device 38 of the image correcting PC 30 via a recording medium like CD-ROM or DVD-ROM, or the Internet or the like. When a command to execute the image correction program is entered through the keyboard 32 or the mouse 33, the image correction program is loaded in the RAM 39. With the execution of the image correction program, the monitor 31 displays a list of thumbnails corresponding to the raw image data written on the external storage device 38.

Figure 2:
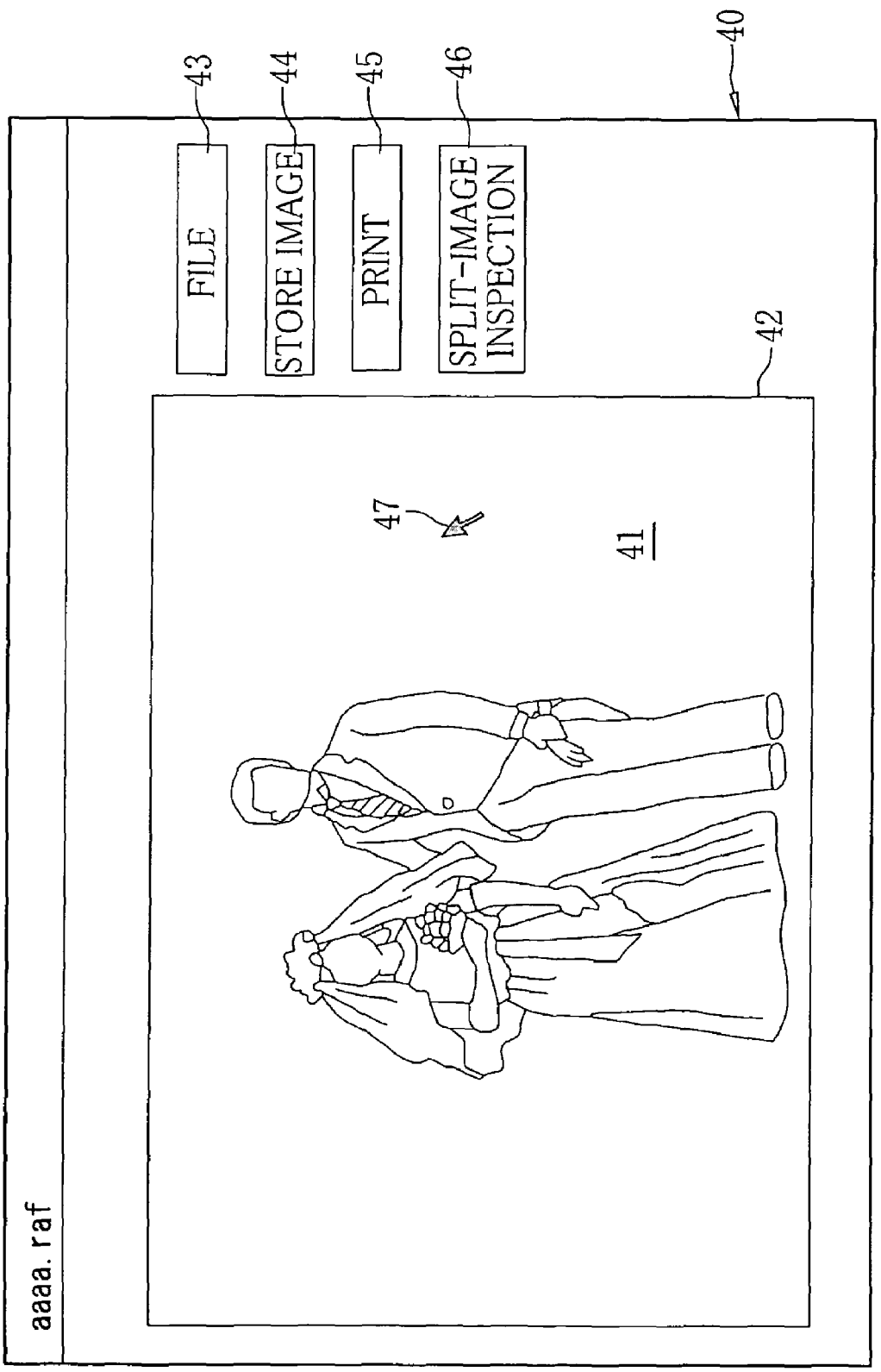
FIG. 2 is an explanatory diagram illustrating a first correction screen.

When the operator designates a image to correct among the thumbnails by operating the keyboard 32 or the mouse 33, the raw image data of the designated image is read out from the external storage device 38 and written in the RAM 39. Then, format of the raw image data is converted into a suitable one for displaying the designated image in a first correction screen 40 on the monitor 31, as shown in FIG. 2, in accordance with default conditions predetermined by the image correction program. For example, the raw image data is converted into Tiff (Tagged Image File Format) data having 16-bit tonal levels for each color.

As FIG. 2 shows, the first correction screen 40 consists of a image display area 42 and a work area for changing correction parameters for correcting white-balance, gradation and the like, though the work area is not shown in FIG. 2. The image display area 42 displays the selected image (the image to correct) 41, whose white-balance, gradation and the like may be corrected by changing the correction parameters on the work area. The raw image data of the selected image 41 is corrected with the changed values of the correction parameters, and image display data for displaying a image is produced again from the corrected image data. Thereby, the image displayed in the image display area 42 reflects the change in the correction parameters. Hereinafter, the process of correcting the raw image data and outputting it as image display data for displaying a image on the monitor 31 will be referred to as "visualizing process".

On the monitor 31, there are also displayed buttons 43, 44, 45 and 46 for entering many kinds of commands. When a cursor 47 is placed and clicked on the file button 43 by operating the mouse 33, the monitor 31 displays the list of thumbnails corresponding to the raw image data stored in the external storage device 38, permitting selection of a image to correct. When the cursor 47 is clicked on the image storage button 44, the raw image data of the image 41 displayed in the image display area 42 is output as a file. When the cursor 47 is clicked on the print button 45, a hard copy of the image 41 displayed in the image display area 42 is printed out. It is of course possible to display other buttons or icons for entering other commands on the monitor 31.

Figure 3:
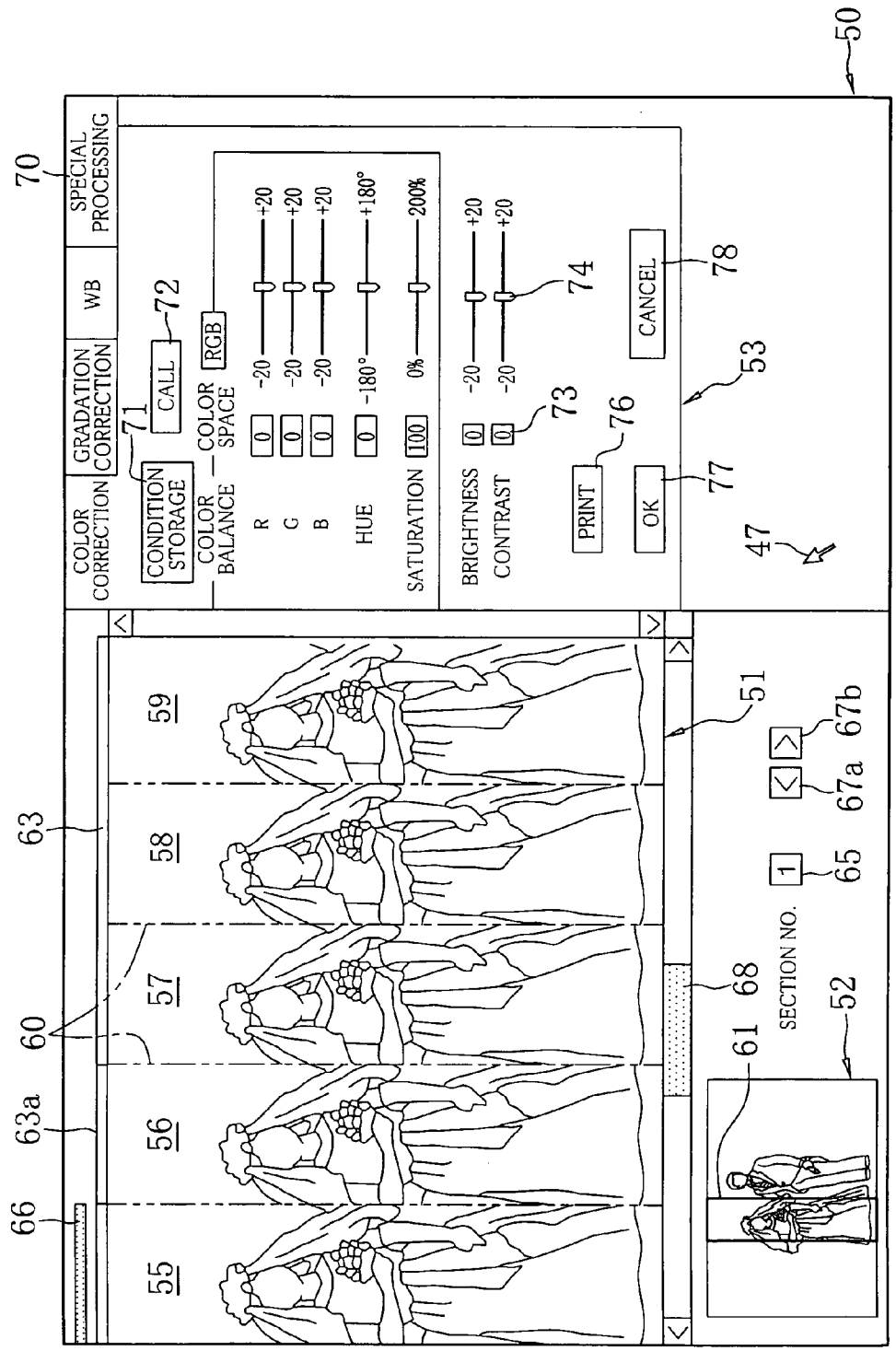
FIG. 3 is an explanatory diagram illustrating a second correction screen containing split image display sections for a split image inspection and correction method.

When the cursor 47 is clicked on the split image inspection button 46, the image correcting PC 30 is switched to a split image inspection mode, so the monitor 31 displays a second correction screen 50 for split image inspection. As shown in FIG. 3, the second correction screen 50 contains a main display area 51, a sub display area 52 and a parameter adjusting area 53.

The main display area 51 is split into a plural number of split image display sections 55, 56, 57, 58 and 59, which adjoin one another. The split image display sections 55 to 59 are served for displaying almost the same fragment of the same image to correct, but differently corrected conditions from each other. Split images displayed in the respective display sections 55 to 59 correspond to the same fragment of the same image, and may also be called a split image. Although borders between the display sections 55 to 59 are shown by phantom lines 60 in the drawings, the borders 60 are not practically displayed in the main display area 51 of the second correction screen 50. The sub display area 52 displays the whole image to correct in a reduced size. The fragment displayed as the split images is indicated by a rectangular frame 61 on the image in the sub display area 52.

In the example shown in FIG. 3, the display sections 55 to 59 consists of a referential display section 55 and first to fourth sections 56 to 59. In this example, the referential display section 55 is located in the leftmost position, and displays the split image in the same condition as the image 41 displayed on the first correction screen 40.

Since the split images displayed in the display sections 55 to 59 are corrected with different correction parameter values from each other, image display data for displaying the split images also differ from each other between the different sections 55 to 59. More specifically, among the image display data used for displaying the image 41 on the first correction screen 40, data of those pixels belonging to the fragment as confined with the rectangular frame 61 in the sub display section 52, are extracted to be used for displaying the split image in the referential display section 55. On the other hand, for displaying the split image in any of the first to fourth sections 56 to 59, data of those pixels belonging to the fragment confined with the frame 61 are extracted from image display data that is obtained through the visualizing process of the raw image data using correction parameter values adjusted on the second correction screen 50. So the first to fourth sections 56 to 59 display the split images which correspond to the same fragment that is confined with the frame 61 but are differently corrected from each other.

Along a top side of the main display area 51 is displayed a active section index bar 63. The active section index bar 63 has a length equal to the top side of the main display area 51, and is divided virtually into sections corresponding to the display sections 55 to 59. When one of the first to fourth sections 56 to 59 is selected as the subject to correct, the selected section, e.g. the first section 56 in FIG. 3, is indicated by high-lighting the corresponding section of the active section index bar 63, as shown by a black section 63a in FIG. 3. Thus, the operator can easily see which of the display sections 56 to 59 is now on correction. Below the main display area 51 is displayed a section number box 65 showing the number of the display section on correction. The number shown in the section number box 65 may be changed by operating the keyboard 32, to switch over the display section to correct. With the change in number in the section number box 65, the high-light section of the active section index bar 63 is switched correspondingly. The display section to correct may also be selected or switched over by clicking the cursor 47 on appropriate one of the display sections 56 to 59.

An indicator 66 displayed above the active section index bar 63 is indicating the referential display section 55. When the referential display section 55 is shifted to another position in the main display area 51, as set forth later, the indicator 66 follows the referential display section 55. It is possible to provide the main display area 51 with more than one referential display section 55. In that case, several indicators 66 are displayed in correspondence with the respective referential display sections 55. Thus the operator can easily discriminate the referential display section 55 that displays the referential split image.

Shift buttons 67a and 67b for shifting the display position of the display sections 55 to 59 are displayed below the main display area 51. For example, when the cursor 47 is clicked on the left shift button 67a while the first section 56 is selected, i.e. the corresponding section 63a of the active section index bar 63 is high-lighted, the first section 56 changes its position with its left adjacent section, i.e. the referential display section 55 in the illustrated example. On the other hand, when the cursor 47 is clicked on the right shift button 67b while the first section 56 is selected, the first section 56 changes its position with its right adjacent section, i.e. the second section 57 in this example.

A scroll bar 68 displayed along a bottom side of the main display area 51 is moved to scroll the split images displayed in the respective sections 55 to 59, for changing the fragment to be displayed as the split images. With the movement of the scroll bar 68, the frame 61 moves on the second display area 52 to show the fragment displayed in the main display area 51 among the whole area of the image to correct 41.

The parameter adjusting area 53 is provided with four types of adjusting screens for color correction, gradation correction, white balance (WB) correction and special effect, which are switched over from one another by selecting one of switching tabs 70 provided in an upper position of the parameter adjusting area 53. If the tab for color correction is selected, as shown in FIG. 3, an adjusting screen for the color correction is displayed in the parameter adjusting area 53, whereby color balance including balance between three primary colors R, G and B, color hue and saturation, brightness, contrast and other parameters may be adjusted.

Below the switching tabs 70 are disposed a condition storage button 71 and a call button 72. When the cursor 47 is clicked on the condition storage button 71, a correction condition file containing current values of the correction parameters is stored under an appropriate name. When the cursor 47 is clicked on the call button 72, a list of stored correction condition files are displayed. By selecting one of the stored correction condition files, the raw image data of the image to correct 41 is subjected to the visualizing process with the correction parameter values contained in the selected correction condition file, so that the selected one of the first to fourth sections 56 to 59 displays the split image in the conditions corrected in correspondence with the selected correction condition file. Therefore, in order to correct the image in the same way as a previously corrected image, the operator has only to read out the correction condition file used for the previously corrected image. Thereafter, the operator may carry out fine-adjustment on the image as corrected according to the previous correction conditions. Therefore, the image may be corrected efficiently.

In a center portion of the parameter adjusting area 53 are displayed respective values of the correction parameters such as the color balance, brightness and contrast. The values of the correction parameters may be changed by entering a numerical value directly in each of data input boxes 73 that are provided for the respective correction parameters, or by shifting indicators 74 left and right in the drawings. With a change in any of the correction parameters, the raw image data corresponding to the image to correct 41 is visualized with the changed correction values, to display the correspondingly corrected split image in the selected section, e.g. in the second section 56, of the main display area 51.

In a lower portion of the parameter adjusting area 53 are disposed a print button 76, an OK button 77 and a cancel button 78. When the cursor 47 is clicked on the print button 76, the image displayed in the main display area 51 is printed out. When the cursor 47 is clicked on the OK button 77, the monitor 31 is switched back to the first correction screen 40, and the image to correct 41 is displayed in those conditions corresponding to the display section 56, 57, 58 or 59 selected at that time. When the cursor 47 is clicked on the cancel button 78, the monitor 31 is also switched back to the first correction screen 40, but the image to correct 41 is displayed in the initial conditions corresponding to the referential split image displayed in the referential display section 55, without reflecting any change in the correction parameters.

If the tab for gradation correction is selected, an adjusting screen for the gradation correction is displayed in the parameter adjusting area 53, whereby tone curve and gamma value may be adjusted. If the tab for white-balance correction is selected, density histograms for respective basic colors are displayed, and parameters for light source and color temperature may be adjusted. If the tab for the special effect is selected, parameters for hyper-tone processing or hyper-sharpness processing may be adjusted.

Figure 4:
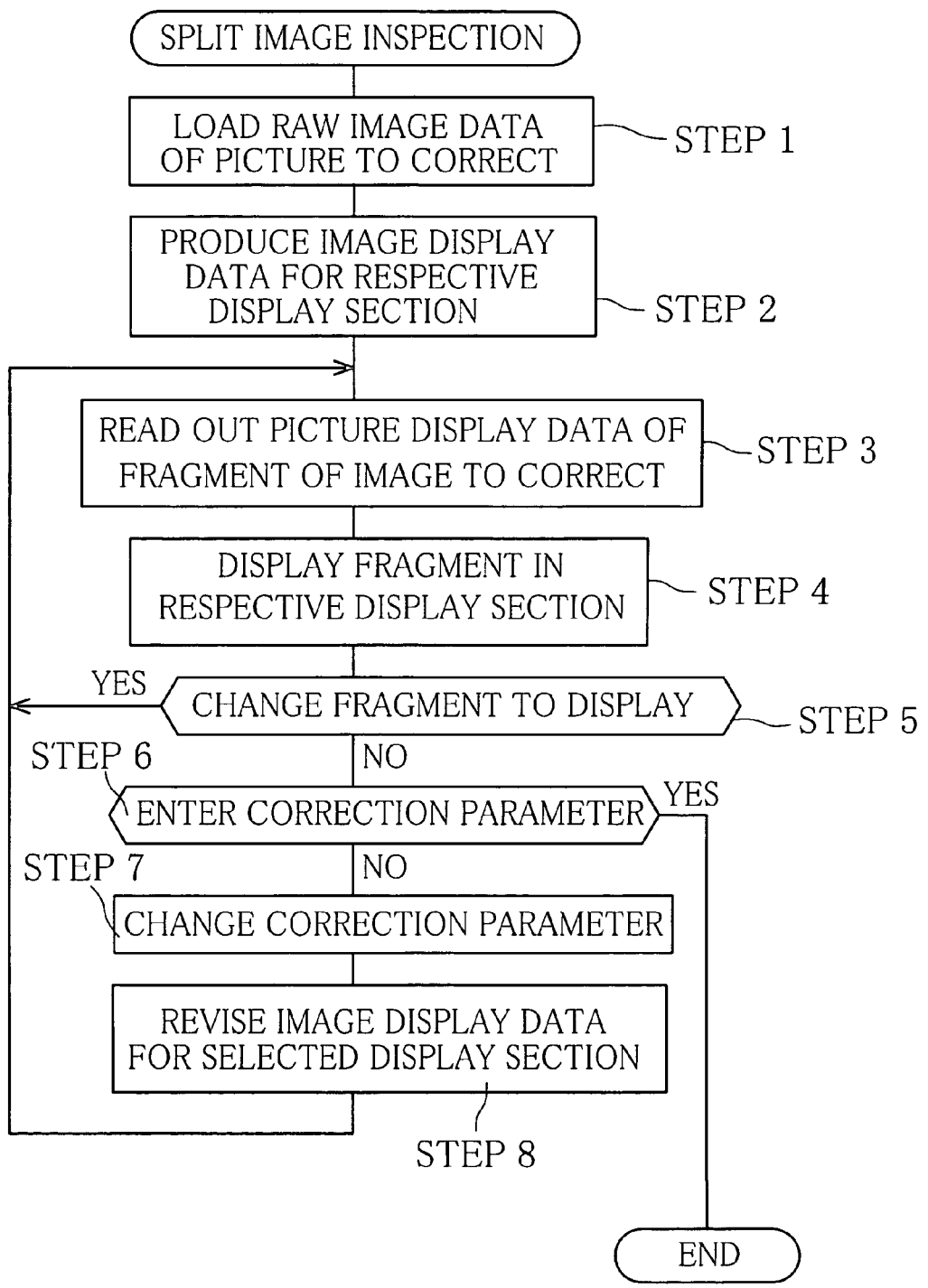
FIG. 4 is a flowchart illustrating a sequence of image correction according to the split image inspection and correction method.

Now the operation of the image correcting PC 30 in the split image inspection mode will be described with reference to the flowchart of FIG. 4. When the split image inspection button 46 is selected, the raw image data of the image to correct 41 as displayed on the first correction screen 40 is loaded in the RAM 39 (step 1). Thereafter, image display data for the first to fourth display sections 56 to 59 are developed in the RAM 39 to produce the image display data for the split images to be displayed in the main display area 51 (step 2).

Next, data of a fragment of the image to correct, i.e. the fragment confined with the frame 61, is read out from the image display data for the display sections 55 to 59 respectively for displaying the split images side by side in the display sections 55 to 59 (step 3 and step 4). As described above, the image display data for the referential display section 55 may be extracted directly from the image display data previously loaded in the RAM 39 for displaying the image to correct 41 on the first correction screen 40. So long as the second correction screen 50 is displayed, the correction parameter values of the referential split image displayed in the referential display section 55 are maintained unchanged. In this initial stage of the split image inspection mode, the image display data for the first to fourth display sections 56 to 59 are corrected with the default correction parameter values in the same as for the referential display section 55. Therefore, the split images displayed in the display sections 55 to 59 are identical, as shown in FIG. 3.

While observing the second correction screen 50, the operator can change the fragment to be displayed in the display sections 55 to 59 within the image to correct 41, or can change the correction parameters on any of the first to fourth display sections 56 to 59 to correct the image. If the fragment to be displayed in the display sections 55 to 59 is changed, that is, when the answer is YES in step 5 of the flowchart, the sequence goes back to the step 3, so that image display data for the changed fragment are read out to revise the split images displayed in the display sections 55 to 59.

On the contrary, if the fragment to display is not changed, that is, the answer is NO in the step 5, the sequence proceeds to step 6 where it is judged whether the OK button 77 or the cancel button 78 is clicked to enter the current correction parameter values. If the OK button 77 or the cancel button 78 is clicked, that is, when the answer is YES in the step 6, the split image inspection mode ends, and the monitor 31 returns to the first correction screen 40 as shown in FIG. 2. If not, the sequence proceeds to step 7, permitting changing the correction parameter values on the currently selected display section of the main display area 51. Based on the changed correction parameter values, the raw image data is subjected to the visualizing process, to obtain revised image display data for the selected display section (step 8). Thereby, the correction results are reflected on the split image displayed in the selected display section.

Figure 5:
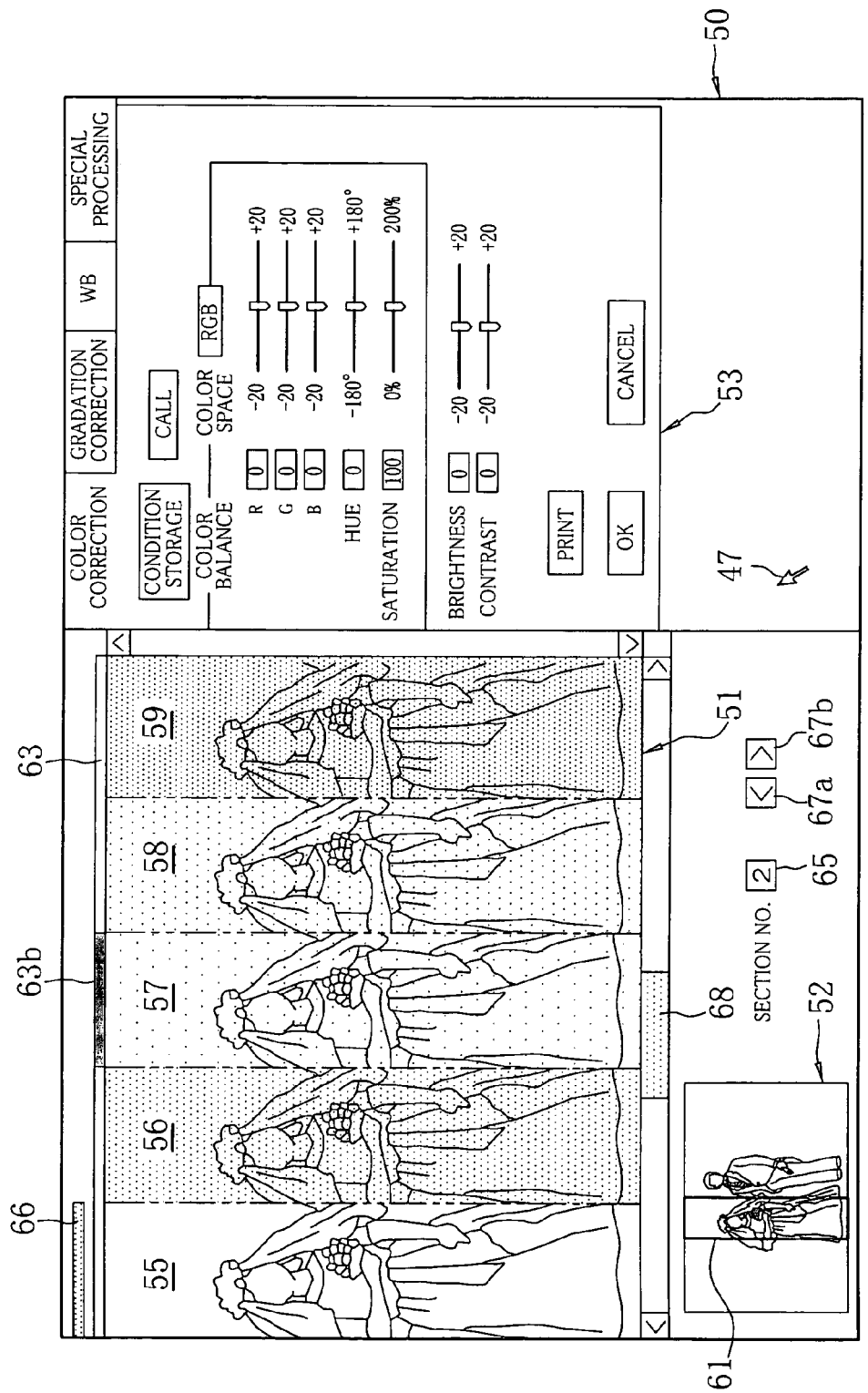
FIG. 5 is an explanatory diagram illustrating the second correction screen displaying the same fragment of the same image but corrected differently between the display sections.

FIG. 5 shows an example of the second correction screen 50 after the correction parameter values are changed differently from each other between the respective display sections 55 to 59, so the split images displayed in these sections 55 to 59 differ from each other in color tone, contrast, white-balance or other parameters. In this example, the section display bar 63 is high-lighted at the section 63*b* corresponding to the second display section 57, to show apparently that the second display section 57 is on correction. In addition, from the position of the indicator 66, it is obvious that the referential display section 55 is located in the leftmost position of the main display area 51.

When the operator changes the correction parameters on the parameter adjusting area 53, the visualizing process is carried out with the corrected parameter values, to produce or revise the image display data for the second display section 57, so the split image displayed in the second display section 57 is revised to reflect the correction results.

Figure 6:
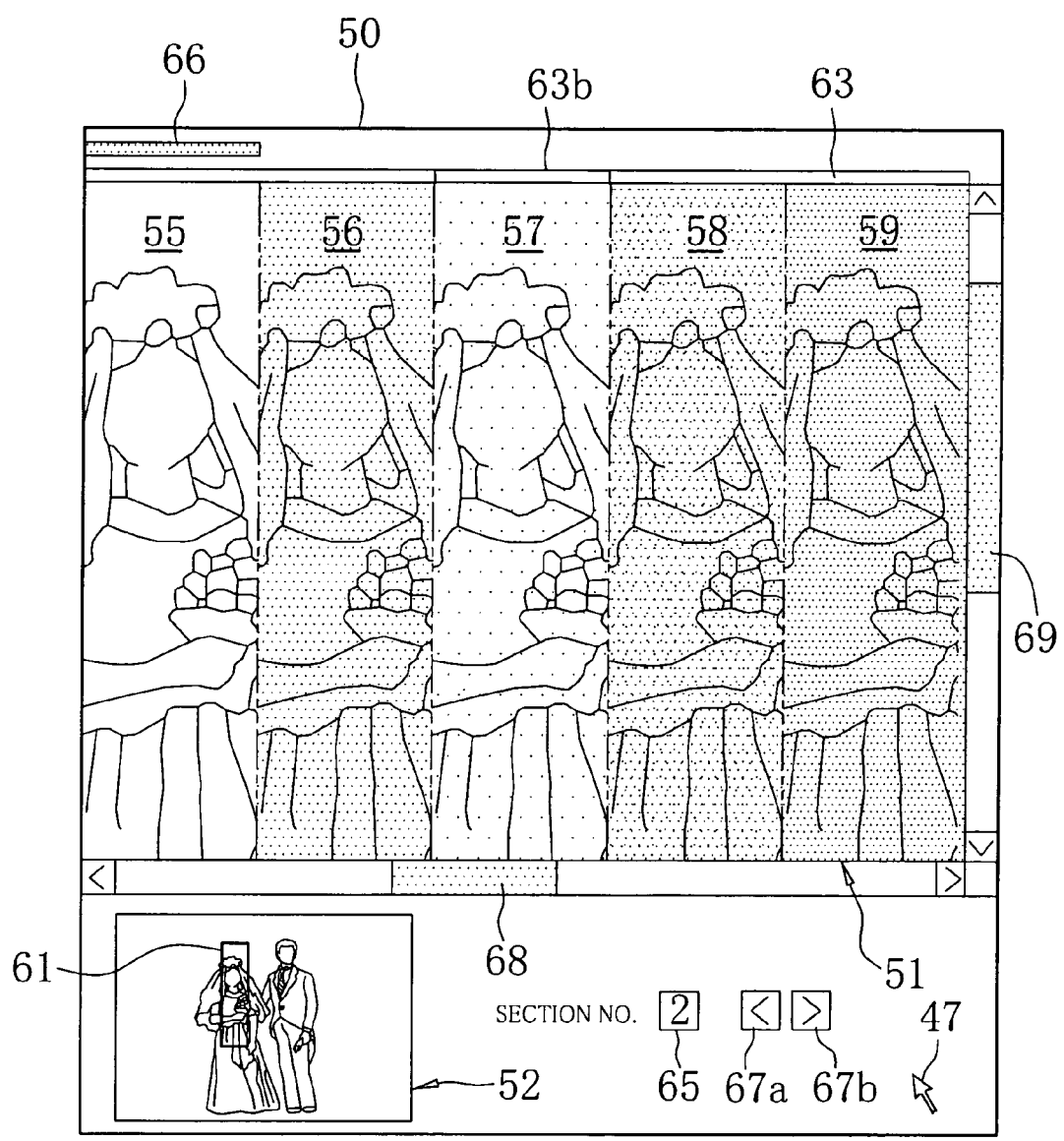
FIG. 6 is a fragmentary view of the second correction screen displaying enlarged split images.
Figure 7:
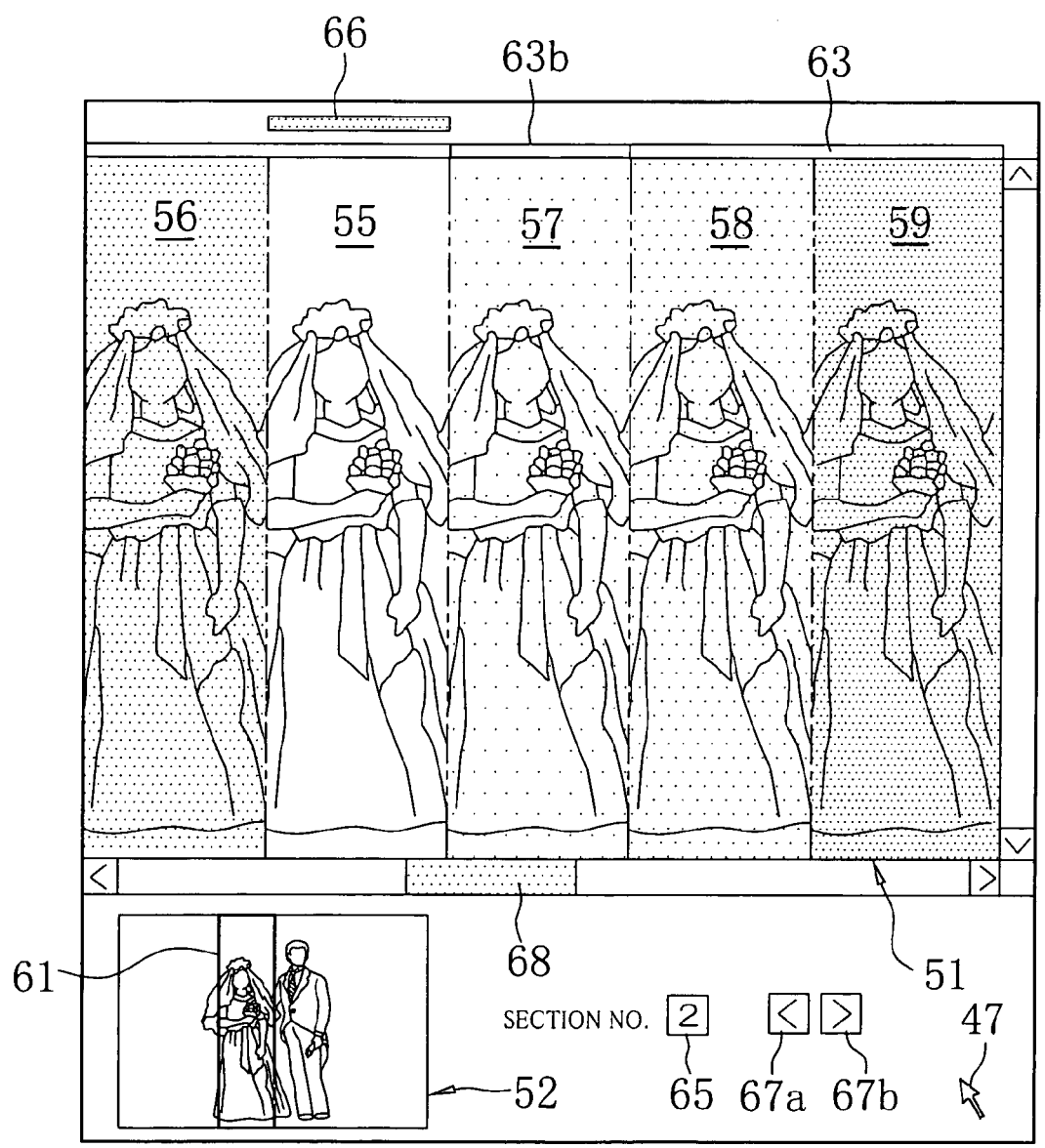
FIG. 7 is a fragmentary view of the second correction screen where a referential split image is displayed in a different section from that of FIG. 5.
Figure 8:
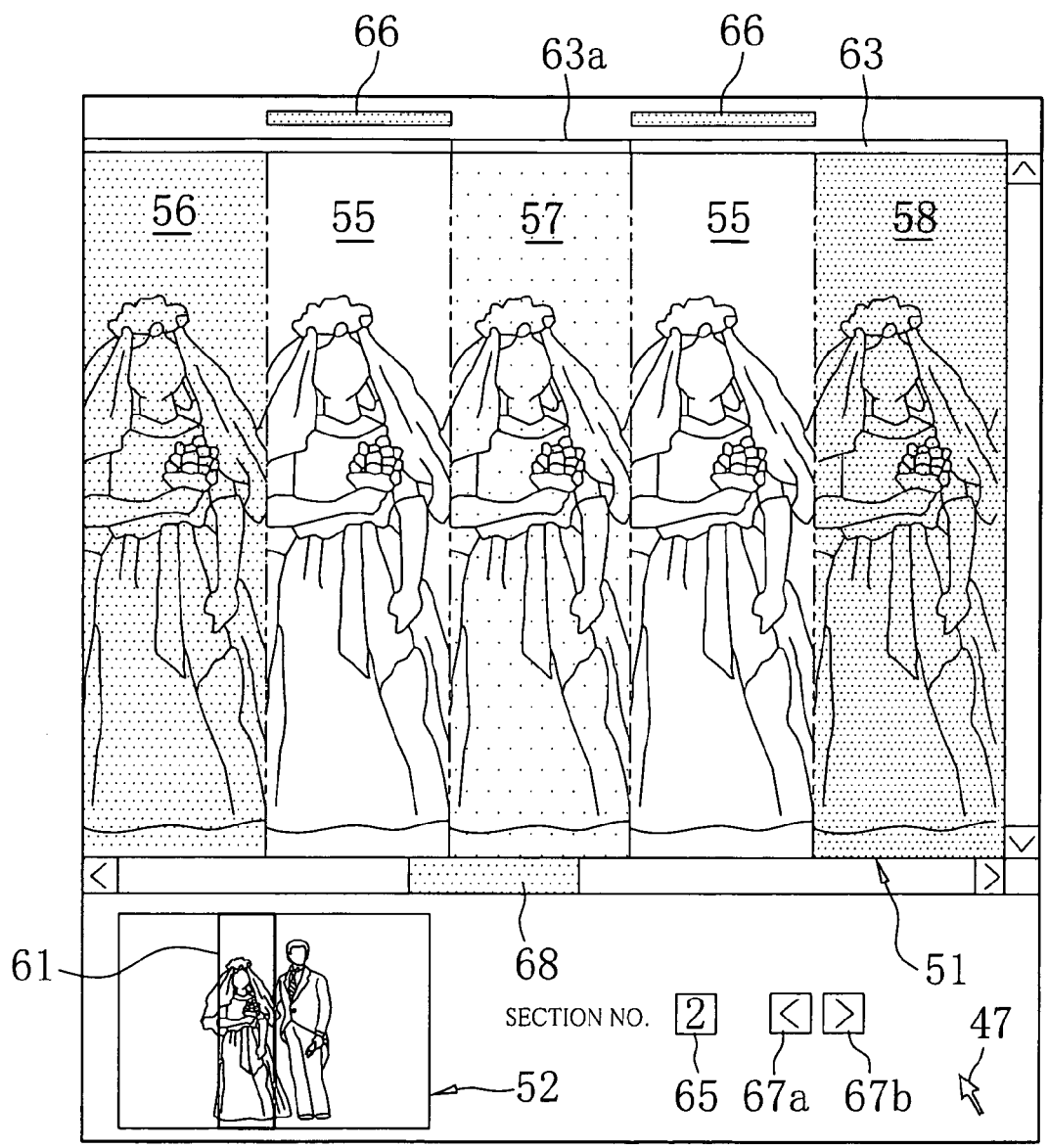
FIG. 8 is a fragmentary view of the second correction screen where the referential split image is displayed in more than one section.

The split images displayed in the main display area 51 may be enlarged or reduced in magnification by changing the size of the frame 61 in the sub display area 52 by operating the mouse 33. For example, as shown in FIG. 6, the split images are enlarged by reducing the size of the frame 61. By shifting the scroll bar 68 or a scroll bar 69 along the bottom side or the right side of the main display area 51, the position of the fragment to display may be changed within the image to correct 41, so the split images displayed in the main display area 51 may be scrolled up and down or left and right. For the sake of simplifying the drawings, the parameter adjusting area 53 will be omitted from FIGS. 6 to 9.

In this way, a fragment of the image to correct 41 is taken out to be displayed in several sections, and corrected with different correction parameter values from one section to another, to display the differently corrected conditions. Therefore, the operator can correct the image while concentrating on a portion aimed to be corrected. For example, in the example shown in FIG. 6, it is possible to finely adjust color tinge and white-balance of woman's face by changing the correction parameter values little by little between the first to fourth display section 56 to 59. Then the operator can compare the differently corrected conditions of the same image to each other without the need for widely moving the eyes, so it is easy to discriminate the difference between the correction results, and the efficiency of the image correction is improved.

As described above, the referential display section 55 may change the position with any of the first to fourth display sections 56 to 59. In an example shown in FIG. 7, the referential display section 55 is interchanged with the first display section 56 in comparison with the example shown in FIG. 5, so it becomes easier to compare the referential split image with the split image of the second display section 57 that is selected to be active in this example. There are several ways to change the display position of the referential display section 55: clicking on the shift button 67a or 67b while the referential display section 55 is selected to be active, dragging the referential display section 55 to the right hand side of the first display section 56, or dragging the indicator 66.

It is possible to provide the main display area 51 with more than one referential display section 55. In an example shown in FIG. 8, two referential display sections 55 are disposed between first to third display sections 56 to 58. To distinguish the referential display sections 55 from the first to third display sections 56 to 58, indicators 66 are displayed over the referential display sections 55. It is of course possible to display the referential display sections 55 in a different way from that shown in FIG. 8, as is shown for example in FIG. 9.

Figure 9:
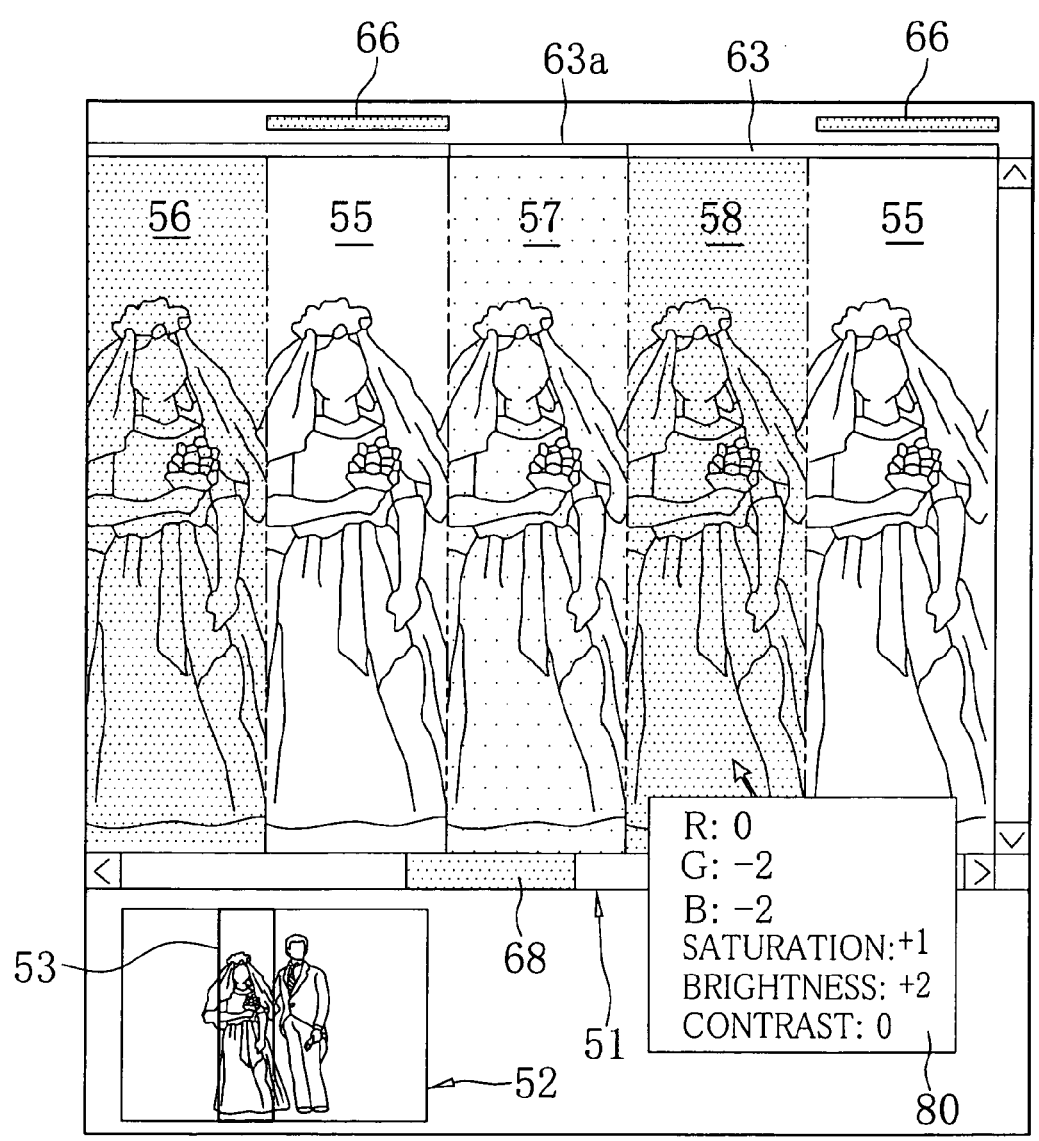
FIG. 9 is a fragmentary view of the second correction screen where an information window showing values of correction parameters is displayed in association with one of the split images.

Furthermore, as FIG. 9 shows, it is possible to display an information window 80 containing a list of correction parameter values used for the split image of any of the display sections 55 to 58, the third display section 58 in FIG. 9. The information window 80 may be displayed when the cursor 47 is placed for a certain time in any of the display sections, or is clicked on any of the display sections. The operator can check the correction parameter values of the individual split images displayed in the main display area 51. It is also possible to display several information windows simultaneously in correspondence with any ones of the display sections.

Although the active section index bar 63 and the indicators 66 are displayed above the main display area 51 in the illustrated embodiment, they may be displayed in a lower portion or below the main display area 51. Although the display sections 55 to 59 are apposed in a horizontal direction of the drawings in the above embodiment, they may be apposed in a vertical direction of the drawings. The display sections 55 to 59 have almost the same width in the illustrated embodiment, but they may have different widths.

In the above embodiment, the main display area 51 is split into five sections, but the number of sections of the main display area 51 may be modified appropriately. It is also possible to change the number of display sections by operating the keyboard 32 or the mouse 33.

Although the image correcting PC 30 is provided by installing the image correction program in a mainframe computer in the above embodiment, it is possible to use a specific computer having specific image correction circuit and visualizing circuit incorporated therein.

Although the present invention has been described with respect to the case where the raw image data is subjected to the image correction process to convert it into image display data for displaying corrected images on the monitor, the present invention is also applicable to a case where image display data, e.g. Tiff data, bit-mapped data or JPEG data, is subjected to the image correction process and then used for reproducing images.

Thus, the present invention is not to be limited to the above-described embodiments but, on the contrary, various modifications will be possible without departing from the scope of claims appended hereto.

What is claimed is:

1. An image display method of displaying an image to correct in an image display area on a monitor, said method comprising steps of:
   splitting said image display area into a plural number of split image display sections for displaying split images which correspond to substantially the same fragment of said image to correct; and
   displaying said split images in conditions corrected based on individual correction parameter values set respectively for said split image display sections.

2. An image display method as claimed in claim 1, wherein when any of said correction parameter values is changed while selecting one of said split image display sections, said selected split image display section displays said split image in conditions corrected with said changed correction parameter values.

3. An image display method as claimed in claim 2, further comprising a step of displaying an index member for indicating said selected split image display section in a peripheral portion around said image display area.

4. An image display method as claimed in claim 1, wherein at least one of said split image display sections is a referential image display section that displays said split image in conditions corrected with fixed correction parameter values.

5. An image display method as claimed in claim 4, further comprising a step of displaying an index member for indicating said referential image display section in a peripheral portion around said image display area.

6. An image display method as claimed in claim 4, wherein the position of said referential image display section may interchange with any of said split image display sections.

7. An image display method as claimed in claim 4, wherein a plural number of said referential image display sections are displayed in said image display area.

8. An image display method as claimed in claim 7, wherein said referential image display sections are displayed such that all of those split image display sections other than said referential image display sections are adjacent to said referential image display sections.

9. An image display method as claimed in claim 1, further comprising a step of displaying at least an information window in association with selected one of said split image display sections, said information window showing a list of correction parameter values used for said split image displayed in said selected split image display section.

10. An image display apparatus with a monitor for displaying an image to correct in an image display area, said image display device comprising:
   a device for forming a plural number of split image display sections in said image display area, said split image display sections displaying split images which correspond to substantially the same fragment of said image to correct; and
   a device for displaying said split images in conditions corrected based on individual correction parameter values set respectively for said split image display sections.

11. An image display apparatus as claimed in claim 10, wherein at least one of said split image display sections is a referential image display section that displays said split image in conditions corrected with fixed correction parameter values.

12. An image display apparatus as claimed in claim 10, further comprising a device for displaying an adjusting area around said image display area, for changing correction parameter values while selecting one of said split image display section.

13. An image display apparatus as claimed in claim 10, further comprising a device for selecting said fragment of said image to correct, which is to be displayed in said split image display sections.

14. An image display apparatus as claimed in claim 10, further comprising a device for changing magnification of said split images displayed in said split image display sections.

15. A computer-readable medium, on which is stored an image display program for activating a computer to work as a device for forming a plural number of split image display sections in an image display area on a monitor, to display substantially the same fragment of an image to correct in said split image display sections, a device for setting correction parameter values individually on said split image display sections, and a device for displaying said fragment of said image to correct in said split image display sections respectively in conditions corrected based on said individually set correction parameter values.

16. An image display method as claimed in claim 1, wherein any one of said split image display sections can be selected, and said correction parameter values for the selected split image display section is adjusted independently of non-selected split image display sections.

17. An image display method as claimed in claim 3, wherein said index member includes a selected portion which is displayed above the split image display section.

18. An image display method as claimed in claim 1, wherein the individual correction parameter values are set for each respective split image display section.

19. An image display method as claimed in claim 1, said method comprising:
   displaying the image to correct in a subdisplay area wherein the split image display section is indicated by a rectangular frame on the image to correct in the subdisplay area.

20. An image display method as claimed in claim 1, wherein a position of a first split image display section is interchangeable with a position of a second split image display section.

21. An image display method as claimed in claim 4, wherein a position of the referential image display section is interchangeable with a position of a split image display section.

22. An image display method as claimed in claim 1, wherein the fragment of the split image display section is derived from a common image.

23. An image display method as claimed in claim 22, wherein the fragment of the split image display section is user defined.

24. An image display method as claimed in claim 23, wherein any one of said split image display sections can be selected, and said correction parameter values for the selected split image display section is adjusted independently of non-selected split image display sections.

* * * * *